(12) United States Patent
Alber

(10) Patent No.: US 11,173,536 B2
(45) Date of Patent: Nov. 16, 2021

(54) METHOD AND DEVICE FOR JOINING WORKPIECES HAVING AT LEAST TWO TRANSPORT DEVICES WHICH CAN BE CONTROLLED INDEPENDENTLY OF EACH OTHER TO CONFIGURE AN OFFSET BETWEEN HEAD ENDS AND/OR REAR ENDS OF THE WORKPIECES PRIOR TO JOINING

(71) Applicant: BAOSTEEL LASERTECHNIK GMBH, Ravensburg (DE)

(72) Inventor: Gerhard Alber, Ravensburg (DE)

(73) Assignee: Baosteel Lasertechnik GmbH, Ravensburg (DE)

( * ) Notice: Subject to any disclaimer, the term of this patent is extended or adjusted under 35 U.S.C. 154(b) by 205 days.

(21) Appl. No.: 16/435,926

(22) Filed: Jun. 10, 2019

(65) Prior Publication Data
US 2019/0329314 A1    Oct. 31, 2019

Related U.S. Application Data

(63) Continuation of application No. PCT/EP2017/071270, filed on Aug. 24, 2017.

(30) Foreign Application Priority Data

Dec. 14, 2016  (DE) .................. 10 2016 124 384.1

(51) Int. Cl.
*B21D 43/00* (2006.01)
*B21D 39/03* (2006.01)
*B23K 26/08* (2014.01)

(52) U.S. Cl.
CPC .......... *B21D 43/003* (2013.01); *B21D 39/03* (2013.01)

(58) Field of Classification Search
CPC  B21D 39/03; B21D 43/003; B23K 2101/185; B23K 26/0838
See application file for complete search history.

(56) References Cited

U.S. PATENT DOCUMENTS 6,011,240 A    1/2000  Bishop et al.
6,034,347 A *  3/2000  Alber .................. B23K 15/0006
                                                219/121.63
(Continued)

FOREIGN PATENT DOCUMENTS

WO    2015/027346 A1    3/2015

OTHER PUBLICATIONS

English translation of International Preliminary Report on Patentability (Chapter I) (Application No. PCT/EP2017/071270) dated Jun. 27, 2019, 8 pages.

(Continued)

*Primary Examiner* — Thomas Randazzo
(74) *Attorney, Agent, or Firm* — Burr & Brown, PLLC

(57) ABSTRACT

The invention relates to a method for controlling a cyclically operating joining device, in particular a welding station, for joining a plurality of workpieces to a circuit board, wherein the joining device comprises at least one first transport device for a first workpiece in a first transport segment, and a second transport device for a second workpiece in a second transport segment, and the transport devices are controlled, independently of each other, by at least one control variable to configure an offset between head ends and/or rear ends of the workpieces prior to joining, wherein the control variable is associated with at least one transport segment of one of the transport devices.

15 Claims, 3 Drawing Sheets

(56) References Cited

U.S. PATENT DOCUMENTS

| | | | | |
|---|---|---|---|---|
| 6,720,520 | B1* | 4/2004 | Bucher | B23K 15/0053 |
| | | | | 219/121.64 |
| 2009/0145888 | A1* | 6/2009 | Hesse | B23K 26/04 |
| | | | | 219/121.64 |
| 2010/0140234 | A1* | 6/2010 | Alber | B23K 26/0604 |
| | | | | 219/121.64 |
| 2011/0041982 | A1* | 2/2011 | Fleming | B23K 20/123 |
| | | | | 156/64 |
| 2013/0193121 | A1* | 8/2013 | Alber | B23K 26/242 |
| | | | | 219/121.62 |
| 2014/0117069 | A1* | 5/2014 | Alber | B23K 26/32 |
| | | | | 228/158 |
| 2014/0248077 | A1* | 9/2014 | Seidel | B23K 26/03 |
| | | | | 403/271 |
| 2016/0184929 | A1* | 6/2016 | Staubli | B23K 26/0846 |
| | | | | 219/121.64 |
| 2017/0182603 | A1* | 6/2017 | Alber | B23K 37/0435 |

OTHER PUBLICATIONS

International Search Report and Written Opinion (Application No. PCT/EP2017/071270) dated Jan. 31, 2018.

* cited by examiner

METHOD AND DEVICE FOR JOINING WORKPIECES HAVING AT LEAST TWO TRANSPORT DEVICES WHICH CAN BE CONTROLLED INDEPENDENTLY OF EACH OTHER TO CONFIGURE AN OFFSET BETWEEN HEAD ENDS AND/OR REAR ENDS OF THE WORKPIECES PRIOR TO JOINING

CROSS REFERENCE TO RELATED APPLICATIONS

This application is a continuation of International Application No. PCT/EP2017/071270 filed Aug. 24, 2017, which designated the United States, and claims the benefit under 35 USC § 119(a)-(d) of German Application No. 10 2016 124 384.1 filed Dec. 14, 2016, the entireties of which are incorporated herein by reference.

FIELD OF THE INVENTION

The present invention relates to a method for controlling a joining device for joining a plurality of workpieces so as to form a blank.

BACKGROUND OF THE INVENTION

Devices as well as methods for joining workpieces, for example, by laser welding, are well known to the person skilled in the art.

The person skilled in the art herein will, in particular, also know methods for transporting and butt-welding sheet-metal panels, in particular, in the construction of bodywork in the automotive industry. To this end, the person skilled in the art will be familiar with the term "tailored blanks", i.e. so-called made-to-measure sheet-metal blanks, for example, for application in the automotive industry. A corresponding method is described, for example, in WO 2015/027346 A1.

It is occasionally a recurring requirement that such blanks ("tailored blanks") are welded to one another with very high precision. This means in other words that blanks (or "tailored blanks", respectively) often meet specific quality criteria only when a predefined offset of the respective workpieces from which the blank is made is adhered to as precisely as possible. The terms LEO ("leading-edge offset") and TEO ("trailing-edge offset"), respectively, will also be known to the person skilled in the art herein.

It is occasionally possible herein that in the case of excessive deviations of such an offset (e.g. LEO or TEO, respectively) of the workpieces of the blank, or excessive deviations of the respective positions of the workpieces of the blank that are welded to one another, respectively, the entire blank cannot meet the requirements and has to be disposed of or reworked. A significant additional complexity is thus associated with the production of made-to-measure sheet-metal blanks under certain circumstances. Moreover, significant additional costs can arise in the production of such blanks.

Under certain circumstances, it is also problematic that the workpieces used for the production of a blank can have significant deviations in terms of the respective dimensions of the workpieces, for example, by poor cutting, so that the respective blanks on account of the use of dissimilar workpieces can have correspondingly dissimilar dimensions. Wear to the transporting installation can be seen as a further problem. For example, a transporting installation that is divided into transporting segments herein can have transporting segments which have been enlarged on account of wear or by expansion, respectively, workpieces being transported on the transporting segments being moved at dissimilar mutual positions such that a correspondingly welded blank can have the deviations mentioned.

It is thus possible that the offset of a plurality of blanks can have irregularities which can represent a significant disadvantage in terms of the further processing of such blanks.

SUMMARY OF THE INVENTION

It is thus an object of the present invention to provide methods and devices which enable an accurate connection when aligning a plurality, in particular, two workpieces so as to form a blank, and thus enable a particularly efficient production of blanks.

In order for the object to be achieved, a method for controlling a cyclically operating joining device, in particular, a welding station, for joining a plurality of workpieces so as to form a blank is proposed, wherein the joining device comprises at least one first transporting installation for a first workpiece in a first transporting segment, and a second transporting installation for a second workpiece in a second transporting segment, and the transporting installations for setting an offset between head ends and/or tail ends of the workpieces prior to the joining are actuated in a mutually independent manner by way of at least one control variable.

It is provided according to the present invention that the control variable is assigned to at least one transporting segment of one of the transporting installations.

Setting an offset between head ends and/or tail ends of the workpieces can thus be performed by way of the transporting installations. By virtue of a regulating capability of the transporting installations, this made it possible for blanks to be producible with high precision, should respective deviations of the dimensions or of the positioning of the blank produced, or of the workpieces used therefor, be ascertained.

In one particular advantageous design embodiment of the present invention, it can be provided that the control variable for a subsequent cycle on the blank is ascertained by a detector after the joining. It is, in particular, advantageous that optionally necessary deviations of an offset can be performed for directly subsequent workpieces. Waste can thus be reduced.

One further advantageous design embodiment of the present invention can provide that the control variable is ascertained by detecting an actual value of the offset between the head ends and/or the tail ends of the workpieces and/or the blank. Several possibilities for detecting an offset are thus provided. This made it possible for a higher precision in the production of the blanks and thus represents an improvement in the efficiency of the method.

In one advantageous refinement of the present invention, it can be provided that in the case of a deviation of the actual value from a nominal value a regulating deviation is ascertained and the regulating deviation is fed to a regulator which in a next cycle of the assigned transporting segment regulates the transporting installations against one another in terms of the transporting speed thereof such that the regulating deviation is compensated. A particularly efficient method for producing welded workpieces so as to form a blank is thus provided, in which method the offset can be maintained with a very high precision in terms of reproducibility. Waste can be further reduced in this way. A regulating deviation can also be understood to be a control variable.

The present invention can moreover provide that an offset of the first transporting segment relative to the second transporting installation is set prior to the joining, so as to be based on the control variable. Setting an offset in this manner can be understood to be a correction of an offset which is performed even before the joining. An even more efficient method with even further reduced waste is thus provided.

It can furthermore be provided that an actual value is detected by a detector. An offset can be ascertained in this way.

The detector is preferably designed as a sensor and/or as a camera. These are efficient and cost-effective design embodiments of detectors which are easy to operate.

It can also be provided that an actual value is reconciled with a nominal value. A comparison of this type with a nominal value represents a particularly simple possibility of regulating or setting or adapting, respectively, an offset in a corresponding manner in the case of any potential deviations, and of guaranteeing an increased efficiency of the method.

It can be provided that a control variable is a deviation of a detected actual value from a predefined nominal value.

In one advantageous refinement of the present invention, it can be provided that a further detection of a further actual value is performed by a further detector, preferably before the joining. The method can thus be operated even more efficiently, and waste can be even further reduced.

The present invention can furthermore provide that the first transporting installation and the second transporting installation are in each case configured as a revolving belt, and a retrieval of the blank by a retrieving mechanism is performed after the detecting of the offset. This represents a further possibility of being able to operate the method even more efficiently. Retrieving can also be understood to be depositing.

The present invention can also provide that the first transporting installation is driven by a first drive, and the second transporting installation is driven by a second drive. Two mutually independent drives can enable very flexible setting possibilities of the two transporting installations such that a corresponding joining device is capable of being used in a very flexible manner. This can significantly increase the efficiency of the joining device.

The present invention furthermore relates to a cyclically operating joining device, in particular, a welding station, for joining a plurality of workpieces by a joining mechanism so as to form a blank, wherein the joining device comprises at least one first transporting installation for a first workpiece in a first transporting segment, and a second transporting installation for a second workpiece in a second transporting segment, wherein the transporting installations for setting an offset between head ends and/or tail ends of the workpieces before the joining are actuatable in a mutually independent manner by way of at least one control variable. It is essential to the present invention that the control variable is assignable to at least one transporting segment of one of the transporting installations.

A device of this type made it possible for workpieces to be welded to one another with high precision so as to form a blank. This high precision made possible a reduction in terms of waste. Moreover, the required precision when joining workpieces can be varied in a flexible manner without interrupting the device in the operation thereof.

A further substantial advantage of the present invention is thus to be seen in that an offset of two workpieces to be joined is capable of being set or varied, respectively, in the ongoing operation of the joining device, in particular, before the joining of the two workpieces. Moreover, blanks can thus be made continuously with a consistent offset and thus also with a consistent quality.

In one advantageous design embodiment, it can be provided that the joining device comprises at least one detector, wherein the detector for detecting an actual value in a transporting direction is preferably disposed after the joining mechanism. The efficiency of the device, and a reduction of waste, respectively, can be increased.

It can furthermore be provided that the joining device comprises at least one first drive and at least one second drive, wherein the first transporting installation is drivable by the first drive, and the second transporting installation is drivable by the second drive.

It can furthermore be provided that the first transporting installation comprises at least two transporting segments, in particular, at least six transporting segments, and that the second transporting installation comprises at least two transporting segments, in particular, at least six transporting segments.

The present invention also relates to a method for setting at least one offset of at least two workpieces which are movable in each case by one continuous transporting installation and which are to be joined by a joining mechanism. It can be provided herein that both workpieces are at least in portions moved relative to one another so as to correspond to a nominal value, that a first detecting installation detects a first actual value which is compared with the nominal value, wherein in the case of a deviation of the actual value from the nominal value a regulating deviation is ascertained and said regulating deviation is fed to a regulator, and wherein the nominal value is set after the feeding of the regulating deviation.

It can likewise be made possible that workpieces are welded to one another with high precision so as to form a blank. Waste can be reduced in a simple way on account of this high precision. Moreover, the required precision when joining workpieces can be varied in a flexible manner without interrupting the device in the operation thereof. It is thus a further substantial advantage that an offset is capable of being set or varied, respectively, in the ongoing operation of the device. Moreover, blanks can thus be made continuously with a consistent offset and thus also with a consistent quality.

To this end, it can also be provided, for example, that the actual value is detected after the joining. It can furthermore be provided that an actual value is detected by a detector that is preferably configured as a camera. A camera is a cost-effective apparatus by way of which actual values are detectable with high precision. Efficiency of the method can be increased on account thereof.

It can moreover be provided that the nominal value is detected by a detector on a workpiece. This represents a simple possibility of a detection. The joining device can thus comprise a detector.

It can also be provided that a first actual value is detected on a first workpiece, and a second actual value is detected on a second workpiece. In this way, further data, or a control variable, respectively, which can permit conclusions pertaining to potential deviations of workpieces which are welded to one another can be ascertained. This can have a positive effect on the efficiency of the method and in particular on the quality of the blanks produced.

It can furthermore be provided that a further detection of the actual value is performed preferably before the joining. It can thus also be ensured even just shortly before the joining that the offset of the blank meets the requirements or parameters, respectively. The number of rejected blanks can thus be significantly reduced. Costs in the production can be saved on account thereof. It can also be provided that a detector in the transporting direction is disposed ahead of the joining mechanism.

It is also possible for the first transporting installation to be driven by a first drive, and the second transporting installation to be driven by a second drive. Separate drives enable a simple regulating capability of the respective transporting installations. A potential maintenance complexity can likewise be reduced.

It is furthermore possible for the setting of the nominal value to be performed by varying the speed of the first and/or the second transporting installation. It can furthermore be provided that actual values are stored by means of the memory installation. This can also be understood in such a manner that speeds of the respective drives of the transporting installations can be varied.

The present invention can moreover provide a method for joining two workpieces so as to form a blank. It can be provided herein that a first workpiece by a first transporting installation, and a second workpiece by a second transporting installation, are moved to a joining mechanism, in particular, laser head, and are joined together, in particular, welded, by a joining mechanism with a defined offset. It is essential that the offset is detected by a sensor or a like detector.

It can, in particular, also be provided that the offset is detected after the joining and before depositing the blank. This can be understood such that the offset is performed before the inserting of two further workpieces. In other words, this can also be understood such that the offset is performed for a next cycle, that is to say, for two subsequent workpieces which are welded to one another.

It can also be provided herein that the offset detected is defined as an actual value which is compared with a defined offset which can be defined as a nominal value. In the case of potential deviations between the actual value and the nominal value, regulating can be performed for the subsequent workpieces which, after the comparison, are welded to one another. In the case of a potentially excessive deviation of the offset of the blank, it is thus still possible that only this blank is optionally treated as waste. However, it is made possible that the subsequent blank has an established offset, since the workpieces required for the subsequent blank are mutually positioned in a corresponding manner on the respective transporting installations before the joining.

The present invention finally also relates to a device for detecting two workpieces, in particular, blanks, which are connected, in particular, welded, to one another, wherein the device comprises a first transporting installation for transporting a first workpiece, and a second transporting installation for transporting a second workpiece, and wherein the device comprises a joining mechanism, in particular, a laser welding head. It is provided according to the present invention that the device comprises at least one sensor or a like detector, by means of which an offset of two workpieces to be connected, in particular, to be welded, to one another is detectable after connecting, in particular, welding.

It can thus still be detected within the device whether the respective blank produced meets predefined requirements. It can, in particular, be ascertained whether the device can be operated at high efficiency.

It can thus be provided that a detection of an offset is performed in the ongoing operation. This made possible a particularly efficient method to be provided.

It can furthermore be provided that, by means of the at least one sensor, a variation of a predefined offset of two workpieces to be connected is detectable. It is preferably provided herein that a detection capability of this type within the device and/or before depositing the workpieces that are connected, in particular, welded, to one another is made possible.

It is accordingly advantageous for the at least one sensor within the device to be disposed after the joining mechanism. In this way, the efficiency of the device can be significantly increased by way of simple means.

It is particular advantageous for at least one sensor to be disposed after the joining mechanism, and for a detection of an offset of workpieces that are welded to one another so as to form a blank is performed before depositing the blank. Instead of depositing, a retrieval of the bank can also be performed.

It is furthermore particularly advantageous when, after a detection of the offset in such a manner, it is ascertained whether the offset of the workpieces that are welded to one another so as to form a blank corresponds to a defined nominal value. Should this not be the case, the blank thus made is to be considered waste. On account thereof, checking of the offset can still be performed in the joining device, in particular, in the ongoing operation.

An offset between head ends and/or tail ends of the workpieces in the context of the present invention also corresponds to an offset. In the context of the invention, an offset is to be considered equal to a lateral offset.

In the context of the present invention, the blank can be referred to using the term "tailored blanks". This is generally to be understood to be so-called made-to-measure blanks. This herein can typically be a sheet-metal blank which is assembled from dissimilar material grades and sheet-metal thicknesses, for example.

This can also be understood to be a so-called prefabricated semi-finished product which can be further processed.

The terms "offset" and "lateral offset" are to be considered to be synonymous in the context of the present invention. A device in the context of the present invention is to be understood to be a joining device.

A detector in the context of the present invention can also be understood to be a position-detector, for example. A detector in the context of the present invention can be configured as a camera. A detector in the context of the present invention can also be configured as a sensor.

A control variable in the context of the present invention can be understood to be a deviation of an actual value from a nominal value. This can also be understood to be a difference between an actual value and a nominal value. A control variable can also be understood to be a deviation of a predefined offset of two workpieces before joining and after joining.

BRIEF DESCRIPTION OF THE DRAWINGS

An exemplary embodiment of the present invention will be explained in more detail hereunder by means of the drawings.

DETAILED DESCRIPTION OF THE DRAWINGS

Figure 1:
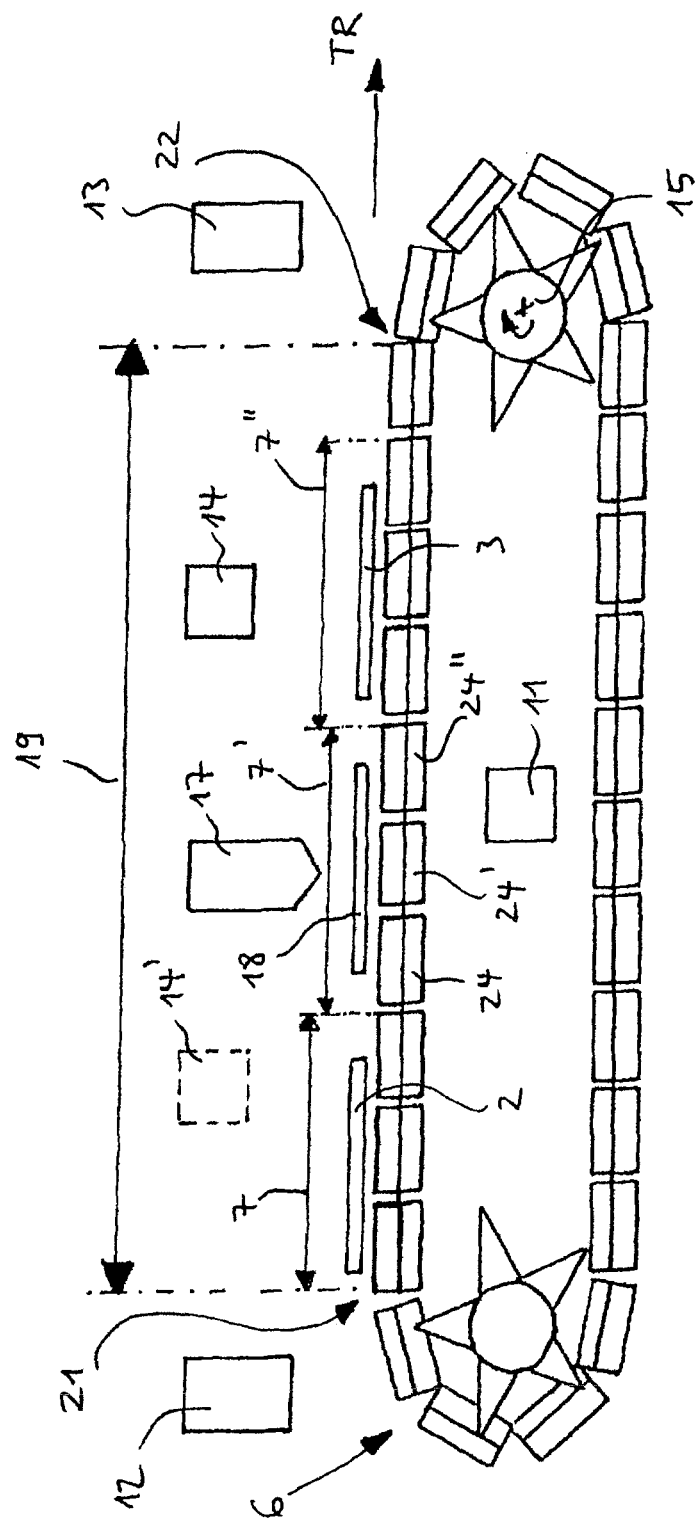
FIG. 1 shows a schematic illustration of a joining device according to the present invention in the longitudinal section.

A joining device 1 is illustrated in a schematic illustration in FIG. 1. The joining device 1 in the exemplary embodiment is designed as a welding machine. Workpieces are welded so as to form a blank, in particular, so as to form "tailored blanks", by way of the joining device 1.

The joining device 1 comprises transporting installations, wherein only a second transporting installation 6 is shown here for reasons of a simplified illustration. It is provided that the joining device 1 comprises at least one further, first, transporting installation (not shown).

All of the features of the second transporting installation 6 can also be configured in the case of the first transporting installation (not illustrated). For the sake of simplicity, this can also be understood such that the second transporting installation 6 and the first transporting installation can be of identical configuration, this also being preferable.

The second transporting installation 6 shown is configured as a revolving transporting belt. The second transporting installation 6 can also be configured as a revolving transporting chain, or as a so-called drag chain. The second transporting installation 6 is preferably configured as a continuous transporting installation.

The transporting installations of the joining device 1 comprise in each case a plurality of transporting segments, wherein such a transporting segment in FIG. 1 is shown as a second transporting segment 7, composed of the segment links 24, 24', 24". The second transporting segment 7 thus comprises a multiplicity of segment links 24, 24', 24" (to this end also see FIG. 4). Further transporting segments 7' and 7", respectively, are illustrated. The further transporting segments 7' and 7", respectively, likewise comprise in each case segment links. The same is provided in an analogous manner for first transporting segments (of the first transporting installation) which are not illustrated.

The transporting installations of the joining device 1 thus comprise a plurality of transporting segments. Respective transporting segments comprise in each case a plurality of segment links.

A workpiece 2 can be positioned or deposited, respectively, between two second transporting segments 7, 7', or 7", respectively, of the second transporting installation 6 and be transported in the transporting direction TR to the joining mechanism 17.

It is also possible for a workpiece 2 to be able to be deposited in a transporting segment, for example, in a second transporting segment 7.

For example, it is possible for second transporting segments 7 or 7' or 7", respectively, to be able to be delimited in each case by two delimiting means (not illustrated), for example, by so-called pushers.

It can thus also be provided in the context of the present invention that the second transporting segment 7 and also the first transporting segment (not shown) in terms of the respective longitudinal extents thereof in the transporting direction TR are adjustable in variable manner.

It can also be provided that the joining device 1 has at least one folding means (not shown) by means of which a delimiting means is capable of being folded away. In this way, a length of a first transporting segment (not shown) or of a second transporting segment 7 or 7' or 7", respectively, can be variably adjusted in a simple manner. It can be made possible that workpieces of dissimilar sizes can be transported.

Figure 2:
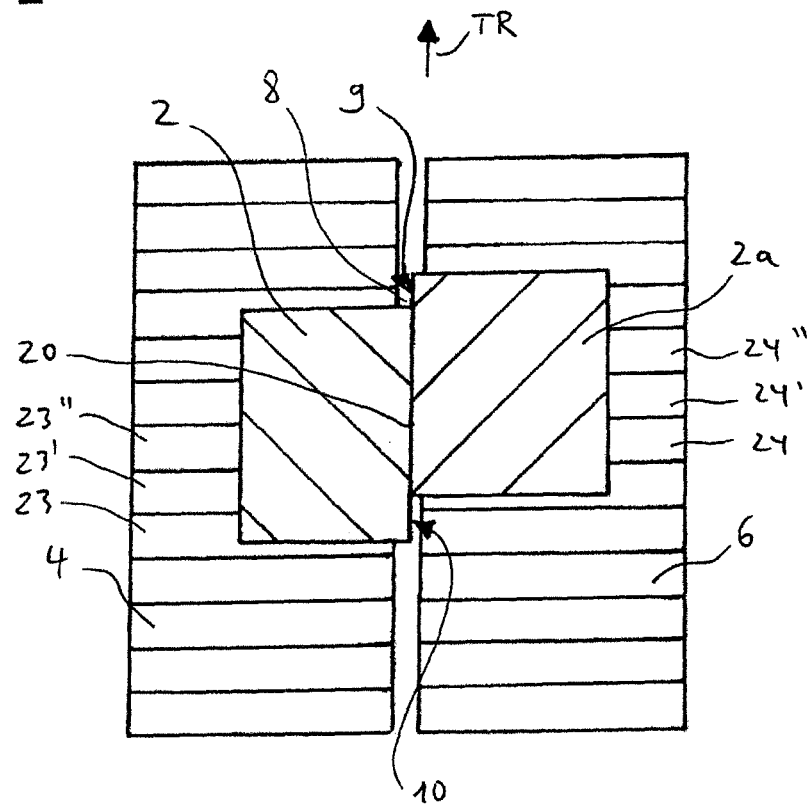
FIG. 2 shows a schematic illustration of a plan view of a fragment of a joining device according to the present invention.

The first transporting installation (not shown) in the exemplary embodiment is configured as a continuous transporting installation and is disposed so as to be parallel to the second transporting installation 6 (see also FIG. 2).

A method for controlling the joining device 1 can be provided by the joining device 1 shown, wherein a plurality of workpieces, presently two workpieces 2, 2a, are joined so as to form a blank 3 in the joining device (see also FIG. 2). The joining in the exemplary embodiment is performed by laser welding. The blank 3 herein can be understood to be a so-called "tailored blank".

The joining device 1 enables setting of an offset 8 between head ends 9 and/or tail ends 10 of the workpieces 2, 2a before the joining. This takes place in that the transporting installations (the second transporting installation 6 is illustrated) before the joining are actuated in a mutually independent manner by way of at least one control variable, and the control variable is assigned to at least one transporting segment (a second transporting segment 7 or 7' or 7", respectively, is illustrated) of one of the transporting installations. This expressly also likewise applies to first and second transporting installations including transporting segments or segment links, respectively.

Figure 3:
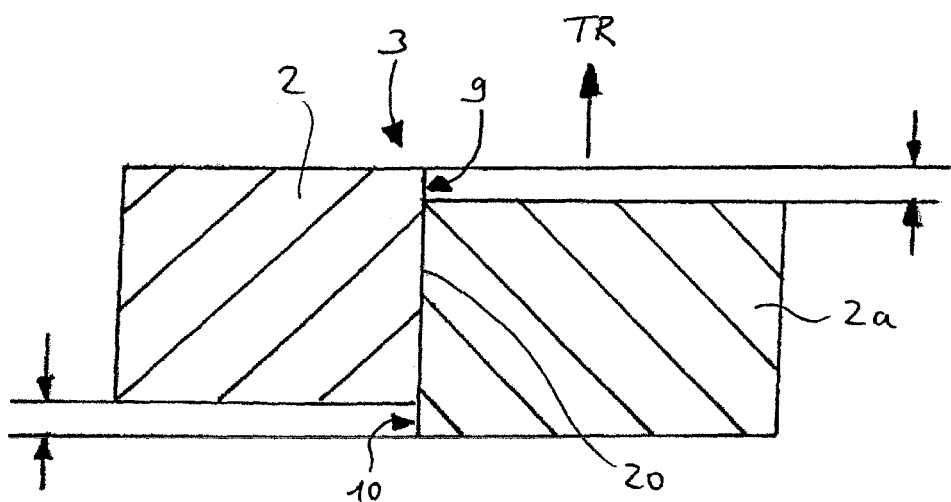
FIG. 3 shows a schematic illustration of two workpieces which are connected so as to form a blank having an offset.

In order for deviations of a predefined offset of the blank 3 to be kept ideally low, the joining device 1 comprises a detector 14 by means of which an offset 8 between two workpieces is detectable (see also FIG. 2 and FIG. 3). The detector 14 in the transporting direction TR is disposed downstream of the joining means 17.

In one further embodiment of the present invention, it can be provided that, alternatively or additionally to the detector 14, a detector 14' which in the transporting direction TR is disposed upstream of the joining mechanism 17 can be provided.

The joining device 1 is configured as a cyclically operating joining device 1. A cycle herein is to be understood that one workpiece 2 is in each case placed onto a transporting installation 6 in a first step. The two workpieces are joined together by a joining mechanism 17 in the second step. The joining mechanism 17 in the exemplary embodiment is configured as a laser welding head. The placed workpieces (the workpiece 2 is illustrated here) are welded so as to form a blank 3 by the joining mechanism. Retrieval of the blank 3 is subsequently performed in a third step.

A new, or a further, cycle begins subsequently thereto with the first step.

In terms of the first step of the cycle, the placing of the workpieces can be performed at a starting point 21, for example. To this end, a feeding means 12 which can also be configured as a robot, for example, can be provided. In terms of the second step, the joining mechanism 17 can be configured as a laser welding head, as in the exemplary embodiment. The placed workpieces (the workpiece 2 is illustrated here) are welded so as to form a blank 3 by the joining mechanism 17. The second step can also be understood such that the blank 3, or the workpieces 2, 2a, respectively, are in work 18. In terms of the third step, a retrieving mechanism 13 by way of which the finished blank 3 can be retrieved from the joining device 1 can be provided, as in the exemplary embodiment.

It can be provided that the joining mechanism 17 is locationally fixed. The retrieval of the blank in the exemplary embodiment is performed at a finishing point 22. The finishing point 22 can also comprise a region and is not at all established in a limiting manner. The starting point 21, in an identical manner, is not at all established and can also comprise a region.

The second transporting installation 6 shown can thus comprise at least one starting point 21 and one finishing point 22, wherein a substantially planar face 19 can be disposed between said two points. The workpieces 2, 2a, or the workpieces 2, 2a that are connected so as to form a blank 3, respectively, are transported on the face (see FIG. 2). The planar face 19 can also be designed in such a manner that the planar face 19 is not horizontally planar. It can moreover be provided that first transporting installations (not shown) and second transporting installations 6 are inclined toward one another, preferably by between 1° and 5°, particular preferably by 2°.

After the retrieval of the blank 3, for example, by the retrieving mechanism 13, the second transporting installation 6 revolves up to a starting point 21. This also applies to the first transporting installation (not shown).

In usual practice it can now arise that a deviation of a predefined offset of a blank 3 can occur, for example, on account of construction-related tolerances in the joining device 1, directly before the beginning of the joining, for example, of the welding process. This means in other words that two workpieces to be joined to one another so as to form a blank are positioned in a manner deviating from a predefined offset of the two workpieces, for example, LEO and/or TEO, before joining, such that deviations by virtue of the materially integral connecting of the two workpieces can no longer be changed after the joining (see also FIG. 2 and FIG. 3). A blank 3 produced in this manner, by virtue of excessive deviations of the existing offset 8 (see FIG. 3, for example) from a predefined offset can occasionally no longer be used for further process steps and thus represents waste.

It is therefore provided according to the present invention that a detector 14 which detects an offset 8 of the blank 3 is provided in the joining device 1. The detector 14 is assigned to a transporting segment (or 7' or 7", respectively) and/or to a delimiting means (not illustrated) of a transporting segment 7, 7' or 7", respectively.

Directly before a subsequent joining, that is to say once a blank 3 has been completed and two further (new) workpieces are placed, a second drive 15 of a transporting installation 6 is offset in the ongoing operation (not illustrated) in relation to the transporting segment 7, 7' or 7", respectively, assigned to the new workpieces and/or the assigned delimiting means of a transporting segment 7, 7' or 7", respectively, corresponding to the detected offset 8 relative to the drive of a further transporting installation (of a first transporting installation, for example). This further drive of the, for example, first transporting installation can be understood to be a first drive.

This can be performed, for example, in such a manner that a second drive is temporarily accelerated or decelerated in relation to a first drive. This can also be performed vice versa.

After joining two workpieces 2, 2a so as to form a blank 3, it is thus detected in a first step whether an offset 8 corresponds to predefined values, for example, a nominal value. This first step is performed after the joining. In a second step, the ascertained offset is assigned to a transporting segment 7, 7' or 7", respectively. In a third step, after an assigning and in the case of a deviation of the detected offset, regulating is performed by means of a regulator 11 of the transporting segments 7, 7' or 7", respectively, or the transporting installation 6 in such a manner that deviations of the offset 8 are compensated.

A schematic illustration of a plan view of a fragment of a joining device according to the present invention (see FIG. 1) is illustrated in FIG. 2. The workpieces 2, 2a are disposed on transporting installations 4, 6. A first transporting unit 4 and a second transporting unit 6 are illustrated. The workpieces 2, 2a that are connected to one another have a joint, in particular, a weld seam 20. Furthermore shown is an offset 8 between head ends 9, the offset in the context of the present invention being able to be referred to as LEO ("leading-edge offset"). Moreover shown is an offset 8 between tail ends 10, the offset in the context of the present invention being able to be referred to as TEO ("trailing-edge offset") (see also FIG. 3). The completed blank 3 is, moreover, shown in FIG. 3.

Figure 4:
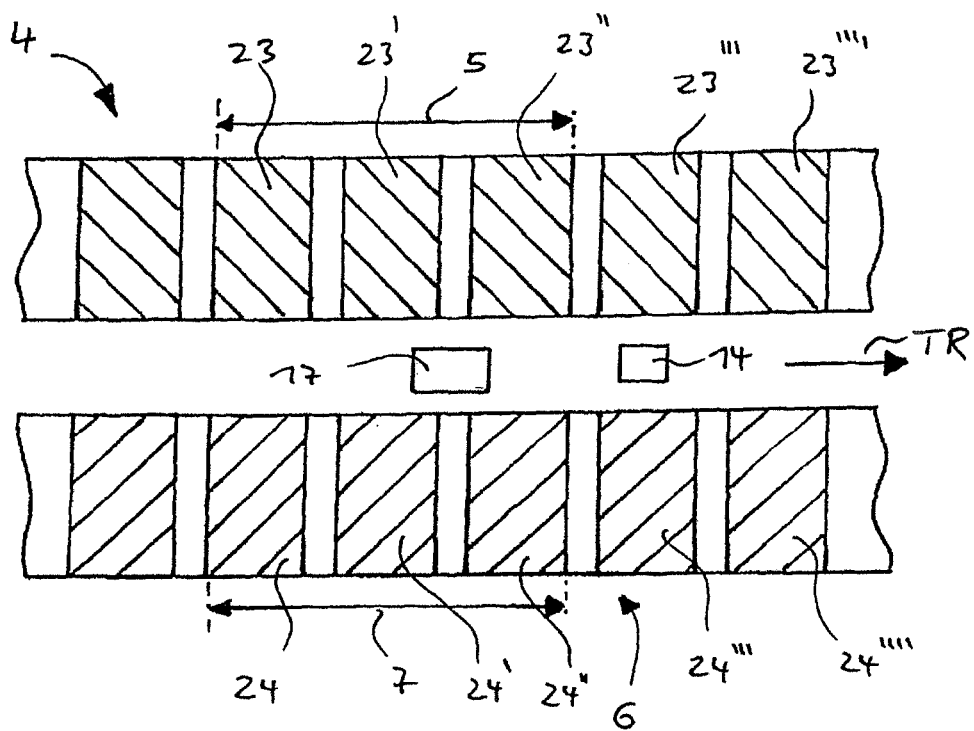
FIG. 4 shows a schematic illustration of a fragment of the joining device in a plan view.

FIG. 4 shows a schematic illustration of a fragment of the joining device (FIG. 1) in a plan view. No workpieces placed thereupon are shown herein for the sake of a simplified illustration. It is illustrated that the joining device comprises a first transporting installation 4 and a second transporting installation 6. It is furthermore illustrated that the first transporting installation 4 comprises a plurality of segment links 23', 23'', 23''', 23'''', and that the second transporting installation 6 comprises a plurality of segment links 24', 24'', 240''', 24''''. It is illustrated in an exemplary manner in the exemplary embodiment that one transporting segment comprises in each case three segment links. Deviating therefrom, it can also be provided that each transporting segment 5, 7 comprises more or fewer than three segment links.

The present invention can thus provide that the first transporting segment 5 comprises at least one segment link 23, and that the second transporting segment 7 comprises at least one segment link 24.

It can furthermore be provided that the segment links 23, 23', 23'', 23''', 23'''', or 24, 24', 24'', 24''', 24'''', respectively, are mutually spaced apart in such a manner that an intermediate space is configured between individual segment links. It can also be provided that segment links are disposed in such a manner that no intermediate space is configured (see FIG. 2).

It can be provided that the transporting installations are in each case configured as a revolving transporting chain, or as a so-called drag chain, respectively. It can furthermore be provided that the segment links are configured as chain links of the drag chain.

It can be provided in a manner not illustrated in more detail that delimiting means which are configured as pushers are disposed, in particular, articulated, on the transporting installation. Transporting segments can be formed and in terms of the length thereof be adjusted in a variable manner by such pushers. It can be provided that such pushers are articulated on the segment links, in particular, on chain links.

LIST OF REFERENCE SIGNS

1 Joining device
2, 2a Workpieces
3 Blank
4 First transporting installation
5 First transporting segment
6 Second transporting installation
7 Second transporting segment
7' Second transporting segment
7" Second transporting segment
8 Offset 9 Head ends (of the workpieces)
10 Tail ends (of the workpieces)
11 Regulator
12 Feeding means
13 Retrieving mechanism
14 Detector
14' Detector (upstream of the joining means 17)
15 Second drive
17 Joining mechanism
18 Blank 3 or workpieces 2, 2a, respectively, in work
19 Planar face (of the transporting installation 4)
20 Joint
21 Starting point
22 Finishing point
23 Segment link (of the first transporting segment)
23' Segment link (of the first transporting segment)
23'' Segment link (of the first transporting segment)
23''' Segment link (of the first transporting segment)
23'''' Segment link (of the first transporting segment)
24 Segment link (of the second transporting segment)
24'' Segment link (of the second transporting segment)
24''' Segment link (of the second transporting segment)
24'''' Segment link (of the second transporting segment)
TR Transporting direction

The invention claimed is:

1. A method for controlling a cyclically operating joining device for joining a plurality of workpieces so as to form a blank, wherein the method uses the joining device that comprises a joining mechanism, at least one first transporting installation for transporting a first workpiece in a first transporting segment in a transporting direction, at least one second transporting installation for transporting a second workpiece in a second transporting segment in the transporting direction, and at least one detector, which is upstream of the joining mechanism, for detecting an actual offset between head ends and/or tail ends of the first and second workpieces in the transporting direction, the method comprising:
   transporting the first workpiece in the first transporting segment and transporting the second workpiece in the second transporting segment in the transporting direction,
   detecting, with the at least one detector, the actual offset between the head ends and/or the tail ends of the first and the second workpieces in the transporting direction prior to the joining,
   setting a predefined offset between the head ends and/or the tail ends of the first and second workpieces in the transporting direction, prior to the joining, by one of accelerating or decelerating a speed of at least one of the first and the second transporting installations based on a deviation of the actual offset detected by the at least one detector from the predefined offset thereby compensating for the deviation as at least one control variable, and
   obtaining the predefined offset between the head ends and/or the tail ends of the first and second workpieces in the transporting direction by assigning the at least one control variable to at least one of the first and the second transporting segments of the at least one of the first and the second transporting installations prior to the joining.

2. The method according to claim 1, wherein in the case of the deviation of the actual offset from a nominal value, a regulating deviation is ascertained and said regulating deviation is fed to a regulator which in a next cycle of the assigned transporting segment regulates the transporting installations against one another in terms of the transporting speed thereof such that the regulating deviation is compensated.

3. The method according to claim 1, wherein the first transporting installation and the second transporting installation are in each case configured as a revolving belt, and a retrieval of the blank by a retrieving mechanism is performed after the detecting of the offset.

4. The method according to claim 1, wherein the first transporting installation is driven by a first drive, and the second transporting installation is driven by a second drive.

5. The method according to claim 1, wherein the control variable for a subsequent cycle on the blank is ascertained by means of a further detector after the joining.

6. The method according to claim 5, wherein a further detection of a further actual value is performed by way of the further detector after the joining.

7. The method according to claim 1, wherein an actual value is detected by way of a further detector after the joining.

8. The method according to claim 7, wherein the actual value is reconciled with a nominal value.

9. The method according to claim 1, wherein the joining mechanism is a welding station.

10. A cyclically operating joining device for joining a plurality of workpieces by a joining mechanism so as to form a blank, wherein the joining device comprises the joining mechanism, at least one first transporting installation for transporting a first workpiece in a first transporting segment in a transporting direction, at least one second transporting installation for transporting a second workpiece in a second transporting segment in the transporting direction, and at least one detector, which is upstream of the joining mechanism, for detecting an actual offset between head ends and/or tail ends of the first and second workpieces in the transporting direction,
   wherein the at least one detector detects the actual offset between the head ends and/or the tail ends of the first and the second workpieces in the transporting direction and a speed of at least one of the first and the second transporting installations is one of accelerated or decelerated for setting a predefined offset between the head ends and/or the tail ends of the first and the second workpieces, before the joining, based on a deviation of the actual offset detected by the at last one detector from the predefined offset thereby compensating for the deviation as at least one control variable, and
   wherein the predefined offset is obtained by assigning the at least one control variable to at least one of the first and the second transporting segments of the at least one of the first and the second transporting installations before the joining.

11. The joining device according to claim 10, further comprising a further detector for detecting an actual value in a transporting direction disposed after the joining mechanism.

12. The joining device according to claim 10, further comprising at least one first drive and at least one second drive, wherein the first transporting installation is drivable by the first drive, and the second transporting installation is drivable by the second drive.

13. The joining device according to claim 10, wherein the first transporting installation comprises at least two transporting segments, and the second transporting installation comprises at least two transporting segments.

14. The joining device according to claim 13, wherein the first and second transporting installations each include at least six transporting segments.

15. The joining device according to claim 10, wherein the joining mechanism is a welding station.

\* \* \* \* \*